(12) United States Patent
Jenniges et al.

(10) Patent No.: US 6,622,550 B1
(45) Date of Patent: Sep. 23, 2003

(54) DRUM BRAKING SYSTEM FOR ROLLING WHEEL TESTING APPARATUS

(75) Inventors: Randal L. Jenniges, Bloomington, MN (US); Paul J. Leska, Sr., Coon Rapids, MN (US)

(73) Assignee: MTS Systems Corporation, Eden Prairie, MN (US)

( * ) Notice: Subject to any disclaimer, the term of this patent is extended or adjusted under 35 U.S.C. 154(b) by 0 days.

(21) Appl. No.: 09/398,338

(22) Filed: Sep. 17, 1999

(51) Int. Cl.$^7$ ................................................ G01L 5/28
(52) U.S. Cl. ........................................ 73/129; 73/126
(58) Field of Search ...................... 73/129, 126, 121, 73/146; 188/156, 218 R, 353; 303/9.62; 200/61.44

(56) References Cited

U.S. PATENT DOCUMENTS

| | | | |
|---|---|---|---|
| 4,160,378 A | * | 7/1979 | Himmler ..................... 73/146 |
| 4,475,383 A | * | 10/1984 | Fischer et al. ................ 73/146 |
| 4,577,497 A | * | 3/1986 | Ray et al. .................... 73/126 |
| 4,856,324 A | | 8/1989 | Potts ........................... 73/146 |
| 4,939,435 A | * | 7/1990 | Takahashi et al. .......... 318/432 |
| 5,241,854 A | * | 9/1993 | Kaizu et al. ................. 73/117 |
| 5,452,605 A | * | 9/1995 | Wilson et al. ................ 73/117 |
| 5,477,943 A | * | 12/1995 | Enomoto et al. ............. 73/129 |
| 5,496,102 A | * | 3/1996 | Dimatteo et al. ........... 303/162 |
| 5,646,849 A | * | 7/1997 | Walenty et al. ........ 364/426.01 |

FOREIGN PATENT DOCUMENTS

| | | |
|---|---|---|
| DE | 28 31 978 A1 | 2/1980 |
| DE | 30 40 252 A1 | 10/1982 |
| EP | 0 406 537 A2 | 1/1991 |
| GB | 762 805 A | 12/1956 |
| WO | WO 95 16903 A | 6/1995 |

OTHER PUBLICATIONS

"Biaxial Wheel/Hub Test Facility", Proceedings of 3rd International User Meeting, Sep. 11, 1997, pp. 1–65.

* cited by examiner

*Primary Examiner*—Max Noori
(74) *Attorney, Agent, or Firm*—Westman, Champlin & Kelly, P.A.; S. Koehler

(57) ABSTRACT

An apparatus and method of operating a rolling wheel testing apparatus includes driving a tire and wheel assembly about an axis of rotation with a tire in rolling contact with a rotatable drum. Torque is sensed about the axis of rotation and rotation of the drum is inhibited so as to develop a selected amount of torque about the axis of rotation as the tire and wheel assembly is rotated.

11 Claims, 12 Drawing Sheets

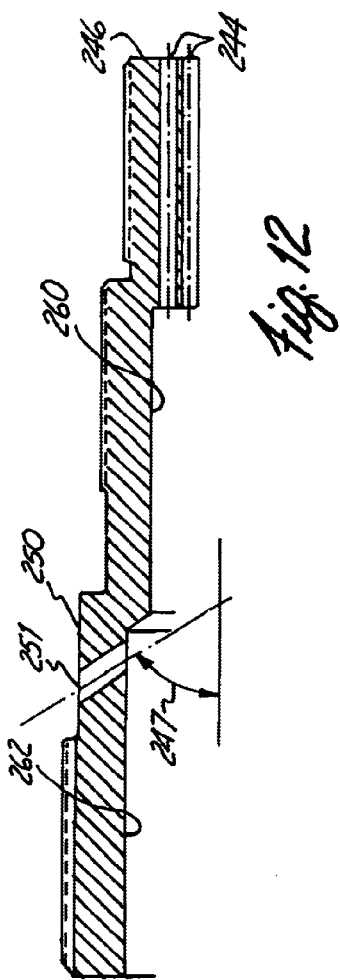
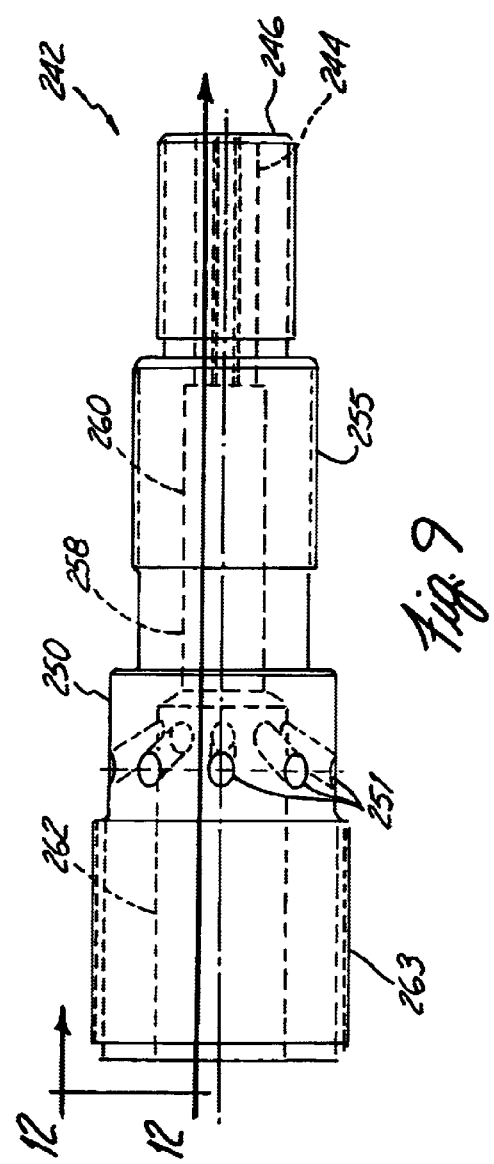

DRUM BRAKING SYSTEM FOR ROLLING WHEEL TESTING APPARATUS

CROSS-REFERENCE TO RELATED APPLICATIONS

The present application relates to the following applications, which are incorporated herein by reference in their entirety: "OUTPUT SPINDLE SHAFT FOR A ROLLING WHEEL TESTING APPARATUS", Ser. No. 09/398,739 and "WHEEL BRAKING SYSTEM FOR A ROLLING WHEEL TESTING APPARATUS", Ser. No. 09/398,725, both of which filed on even date herewith.

BACKGROUND OF THE INVENTION

The present invention relates to testing apparatuses used to test components of a motor vehicle. More particularly, the present invention relates to a testing apparatus used to test tire, wheel, spindle and/or braking components of a motor vehicle, for instance, specifically wheel fatigue and wheel lug nut retention.

A rolling wheel testing apparatus using the inside of a rotating drum was developed by the Fraunhofer-Institut Fur Betriebsfestigkeit and has been shown to be an effective test technique. Generally, a tire and wheel assembly is mounted to a drive motor and is disposed within a drum where the tire engages an inside circumferential surface. Improvements have been made on the original design to simulate loading when the tire and wheel assembly is mounted to a motor vehicle as the motor vehicle travels down a road. The loading can include radial wheel loading to simulate the weight and dynamic loading of the vehicle and lateral loading where the load is applied along the axis of rotation of the tire and wheel assembly. In yet further embodiments, applications of driving and braking torque have also been proposed in "Adapting the Biaxial Wheel Test System for Brake Components and Lug-Loosening", published in the Proceedings of the 3rd International User Meeting, Sep. 11, 1997, Darmstadt, Germany.

Although the original design has been found effective and improvements have been made to simulate road conditions, shortcomings are still present. For instance, accurate simulation of the torque loading upon the tire and wheel assembly as the motor vehicle initially accelerates from a standing stop is lacking. Secondly, although proposed apparatuses use production brake caliper designs, other brake system components are not included.

In addition, it is desirable to install strain gauges and/or other sensors to measure various parameters of the wheel as it rotates within the drum. However, in view that the wheel rotates within the drum, extracting the signal data is, at best, challenging. Although radio transmitters and associated receivers can be used to obtain this information, this technique is considered unsatisfactory in view that a considerable amount of electric noise is present during operation.

An improved rolling wheel testing apparatus that addresses one, some or all of these concerns is therefore desired.

SUMMARY OF THE INVENTION

An apparatus and method of operating a rolling wheel testing apparatus includes driving a tire and wheel assembly about an axis of rotation with a tire in rolling contact with a rotatable drum. Torque is sensed about the axis of rotation and rotation of the drum is inhibited so as to develop a selected amount of torque about the axis of rotation as the tire and wheel assembly is rotated.

BRIEF DESCRIPTION OF THE DRAWINGS

FIG. 9 is a side elevational view of a spindle shaft end.

FIG. 12 is a sectional view of the spindle shaft end taken along lines 12—12 of FIG. 9.

DETAILED DESCRIPTION OF THE ILLUSTRATIVE EMBODIMENTS

Figure 1:
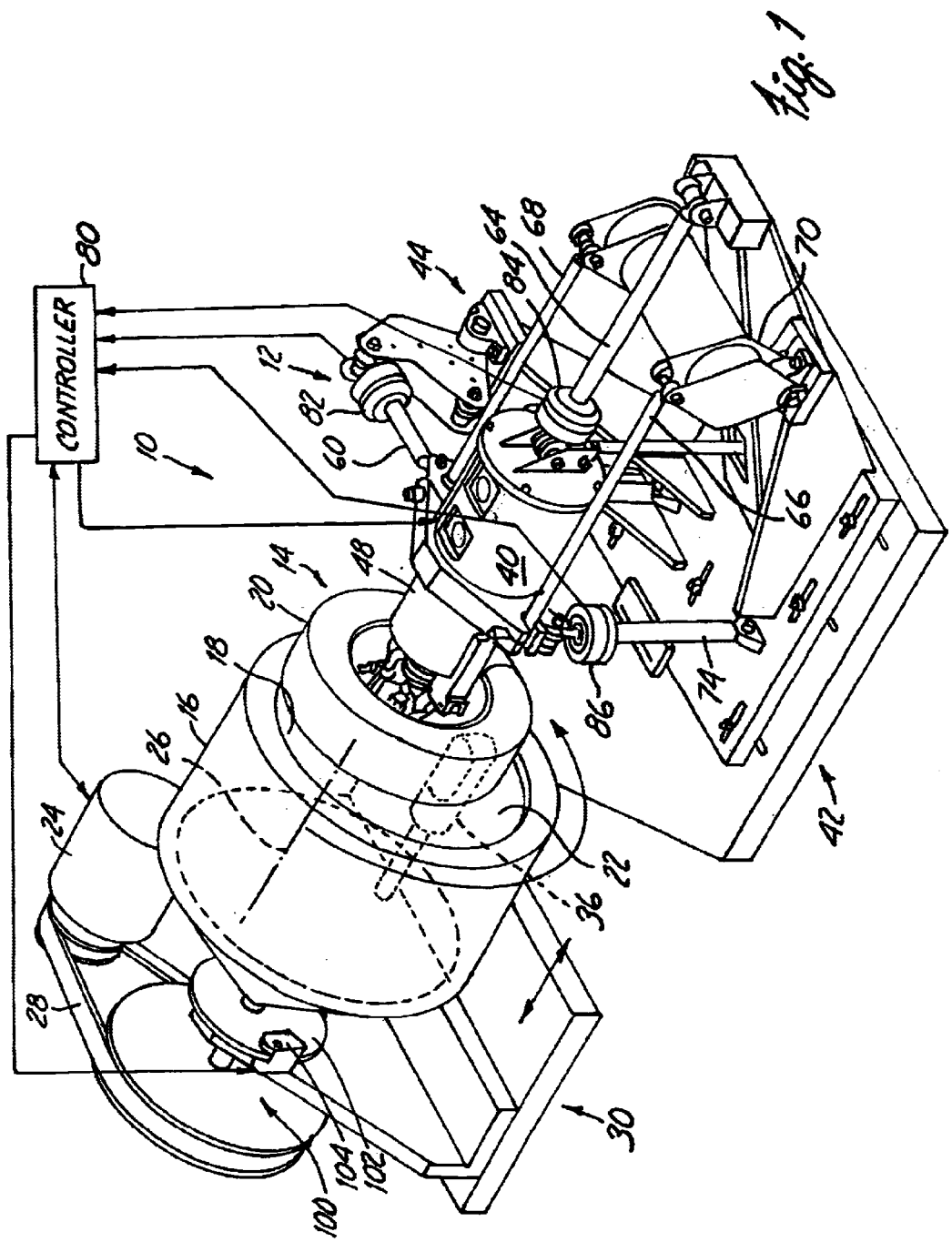
FIG. 1 is a somewhat schematic perspective view of a rolling wheel testing apparatus with portions removed.

A rolling wheel testing apparatus incorporating different aspects of the present invention is illustrated in FIG. 1 at 10. Generally, the testing apparatus 10 includes a support structure 12 that supports a tire and wheel assembly 14 in engagement with a rotating drum 16. In the embodiment illustrated, the rotating drum 16 includes a large inner cavity 18 into which the tire and wheel assembly 14 is disposed so that a tire 20 engages an inner circumferential surface 22. In one mode of operation, a suitable hydraulic or electric motor 24 drives the drum 16 to rotate about an axis 26. In the embodiment illustrated, an endless member 28, such as a belt or chain, is provided for speed reduction and amplification of drum torque, although direct coupling of the motor 24 to the drum 16 can be used, if desired.

With the tire 20 engaging the inner circumferential surface 22 of the drum 16, lateral loads can be applied by movement of the drum 16 substantially parallel to the axis of rotation 26. A slide assembly 30 is provided for movement of the drum 16. An actuator system 36 displaces the drum 16 on the slide assembly 30.

Generally, the support structure 12 includes a driving motor torque assembly 40 that is supported over a base 42 with a plurality of struts 44. The driving motor torque assembly 40, discussed below in detail, includes a motor 46 (FIG. 7) that drives a spindle 48 which, in turn, drives the tire and wheel assembly 14. Typically, the tire and wheel assembly 14 is supported on the spindle 48 with production components 50 (FIG. 4) of the vehicle suspension (i.e. those components which are generally provided on the motor vehicle). Production brake components 51, such as a brake caliper or brake drum, are also provided and used conventionally to selectively inhibit rotation of the tire and wheel assembly 14. A suitable fixture supports the suspension and brake components on the spindle 48 in proper relation to each other. It should be noted that the tire and wheel assembly 14, spindle and/or braking components are those suitable for application in a motor vehicle as opposed to being specially designed for the testing apparatus 10. The testing apparatus 10 allows these components to be tested under simulated road conditions. Thus, as used herein, "application in a motor vehicle" is defined as being components generally of size and shape for installation in the motor vehicle, which can include specialty vehicles such as race cars. However, the testing apparatus 10 is particularly useful for testing components designed for "production" motor vehicles, wherein "production", as used herein, shall mean vehicles produced in mass quantity (greater than approximately 200 units).

Figure 5:
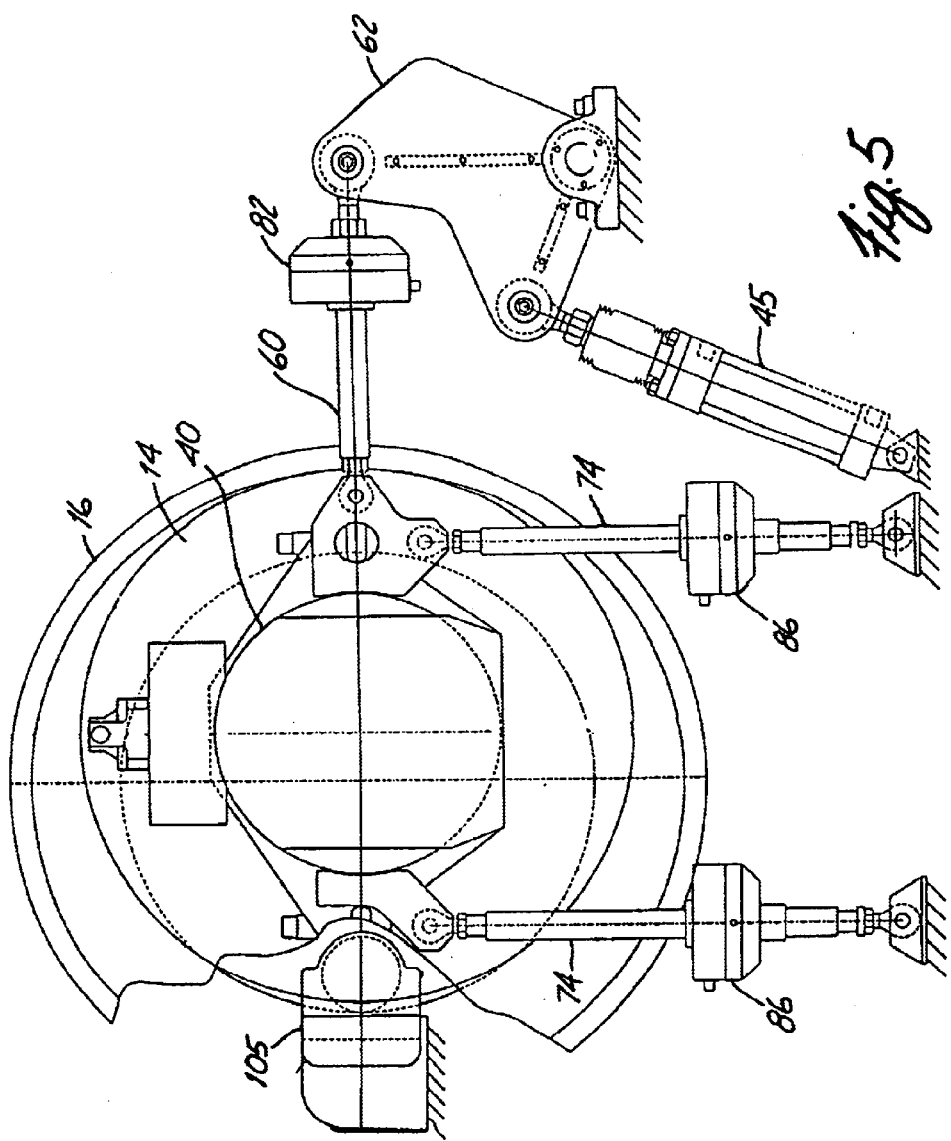
FIG. 5 is a schematic sectional view taken along lines 5—5 in FIG. 4 with portions removed.

The plurality of struts 44 movably support the drive motor assembly 40 and tire and wheel assembly 14 attached thereto. Referring to FIGS. 1 and 5, the plurality of struts 44 include a strut 60 that is operably connected to an actuator 45. The actuator 45 applies a radial load through the strut 60 so as to simulate substantially vertical loads on a motor vehicle such as the vehicle weight and dynamic loading. In the embodiment illustrated, a bell crank 62 is provided as a lever arm and to maintain a compact assembly. Direct connection of the actuator 45 to the strut 60 can also be provided.

Lateral loads are reacted through a strut 64 that is connected between the driving motor torque assembly 40 and the support base 42. A pair of vertical struts 74 support the drive motor assembly 40 above the base support 42. In the embodiment illustrated, stabilizing struts 66 and 68 are also provided, the struts 66 being connected to a common pivoting member 70.

The driving motor torque assembly 40 rotates the tire and wheel assembly 14 and applies drive torque through the spindle 48. A braking torque is generated when the braking components (e.g. brake caliper) is operated to inhibit rotation of the tire and wheel assembly 14.

A controller 80 receives measurement signals indicative of loads applied to the tire and wheel assembly 14. In the embodiment illustrated, a load cell 82 on strut 60 is used to measure radial loads, while a load cell 84 on strut 66 measures lateral loads. The struts 66 and pivoting member 70 isolate moments from the load cell 84. Drive torque and braking torque are measured through load cells 86 provided on the vertical struts 74. Based on desired and measured loads, the controller 80 provides command signals to the motor 24 and drive motor assembly 40. As appreciated by those skilled in the art, the controller 80 can be an analog and/or digital controller.

An active braking system 100 inhibits rotation of the drum 16, while it is rotating in order to induce desired drive torque at the spindle 48 and in the tire and wheel assembly 14. It has been known to include a brake to hold the drum 16 stationary while the drive motor assembly 40 is operated so as to induce a torque in the spindle 48 and tire and wheel assembly 14. In this prior art design, the brake is then released so as to allow the tire and wheel assembly 14 and drum 16 to rotate. However, road conditions, such as sustained torque during acceleration, are simulated more accurately by inhibiting rotation of the drum while it is rotating. In the embodiment illustrated, the active braking system 100 includes a brake disc 102 attached to the drum 16 to rotate therewith. A brake 104, operated by the controller 80, selectively engages the disc 102 with proportional clamping pressure as a function of desired drive torque herein measured by load cells 86. In the embodiment illustrated, a servo-controlled hydraulic brake 104 is used although pneumatic or electromagnetic braking systems can also be used as appreciated by those skilled in the art.

In operation, the controller 80 operates the drive assembly 40 in speed control to obtain a selected rotational speed of the tire and wheel assembly 14. Speed feedback can be provided using a number of techniques. For example, speed sensors can be directly incorporated in the spindle 48 or drum 16. In the embodiment illustrated, speed feedback is provided through a speed sensor (encoder, resolver, or similar device) operably coupled to the motor 24, which is not operated in this operating mode and spins freely with rotation of the drum 16.

Figure 2:
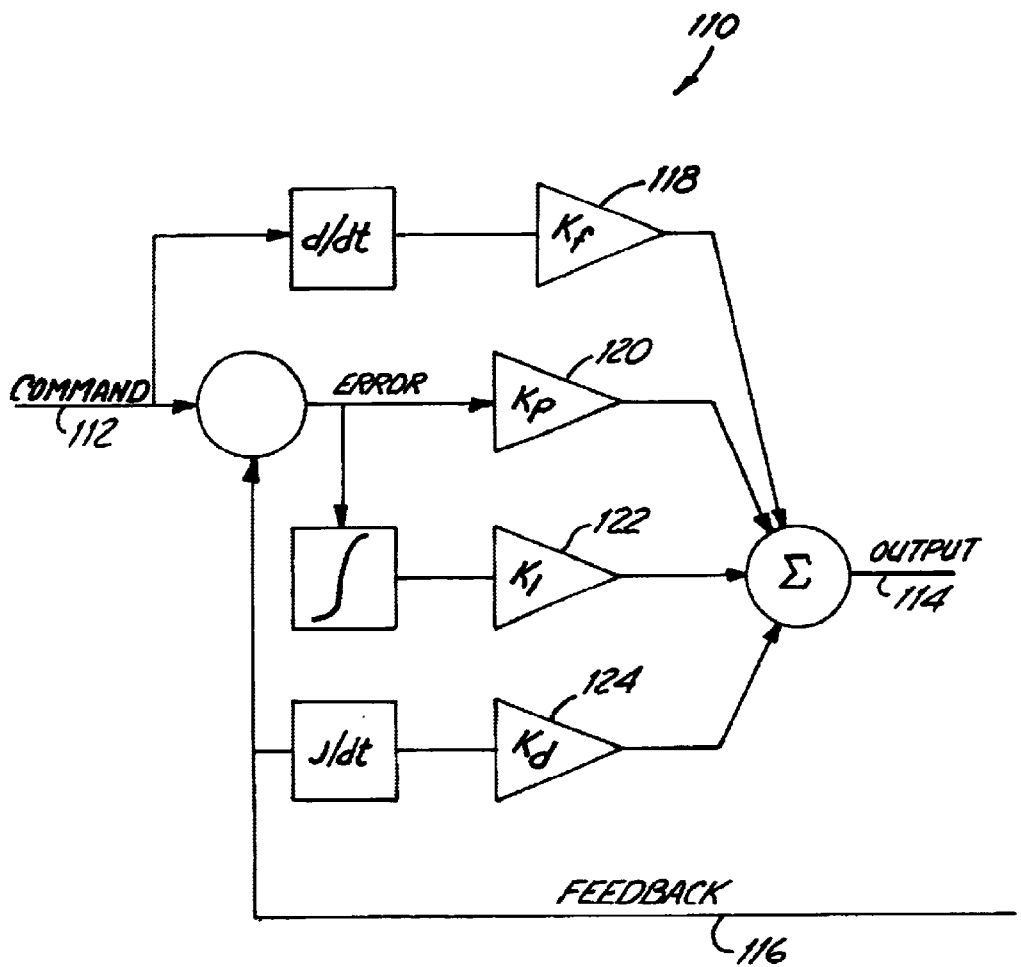
FIG. 2 is a block diagram of a control system for use in the testing apparatus.

The brake 104 inhibits rotation of the drum 16 until an initial selected torque is generated at the selected speed. The controller then operates the drive assembly 40 and braking system 100 to match a selected speed and/or torque profile. FIG. 2 illustrates a control system 110 operable in the controller 80 to control the drive assembly 40 and/or braking system 100. As appreciated by those skilled in the art, the control system 110 is a proportional-integral-derivative (PID) controller with a feed-forward branch. Desired speed or torque is provided at input 112. An output 114 to the drive assembly 40 or brake 104 is provided as a function of the input 112 and feedback 116. Gain elements 118, 120, 122 and 124 are chosen as a function of system characteristics and desired performance.

Figure 3:
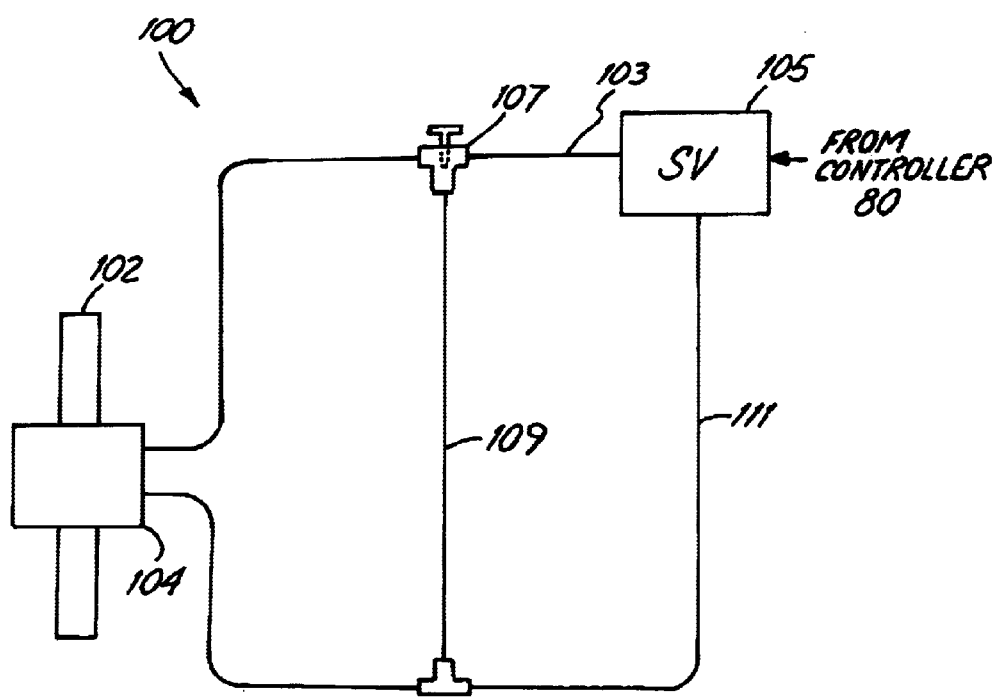
FIG. 3 is a hydraulic brake circuit.

FIG. 3 schematically illustrates a hydraulic circuit of the braking system 100. A servo valve 105, operated by the controller 80, provides fluid pressure for the brake 104. Although the controller 80 uses a PID control loop with a feed-forward element, it has been found that additional mechanical damping was preferable. As illustrated, a needle valve 107 is provided in a pressure line 103. The needle valve 107 provides an adjustable orifice through which fluid can bypass the brake 104. A fluid line 109 is fluidly coupled to a return line 111. The needle valve 107 is adjusted to provide desired operating response of the brake 104. As appreciated by those skilled in the art, an alternate servo valve can be used to provide the same mechanical damping provided by the needle valve 107. However, using the needle valve 107 allows a standard single servo valve to be used.

Figure 4:
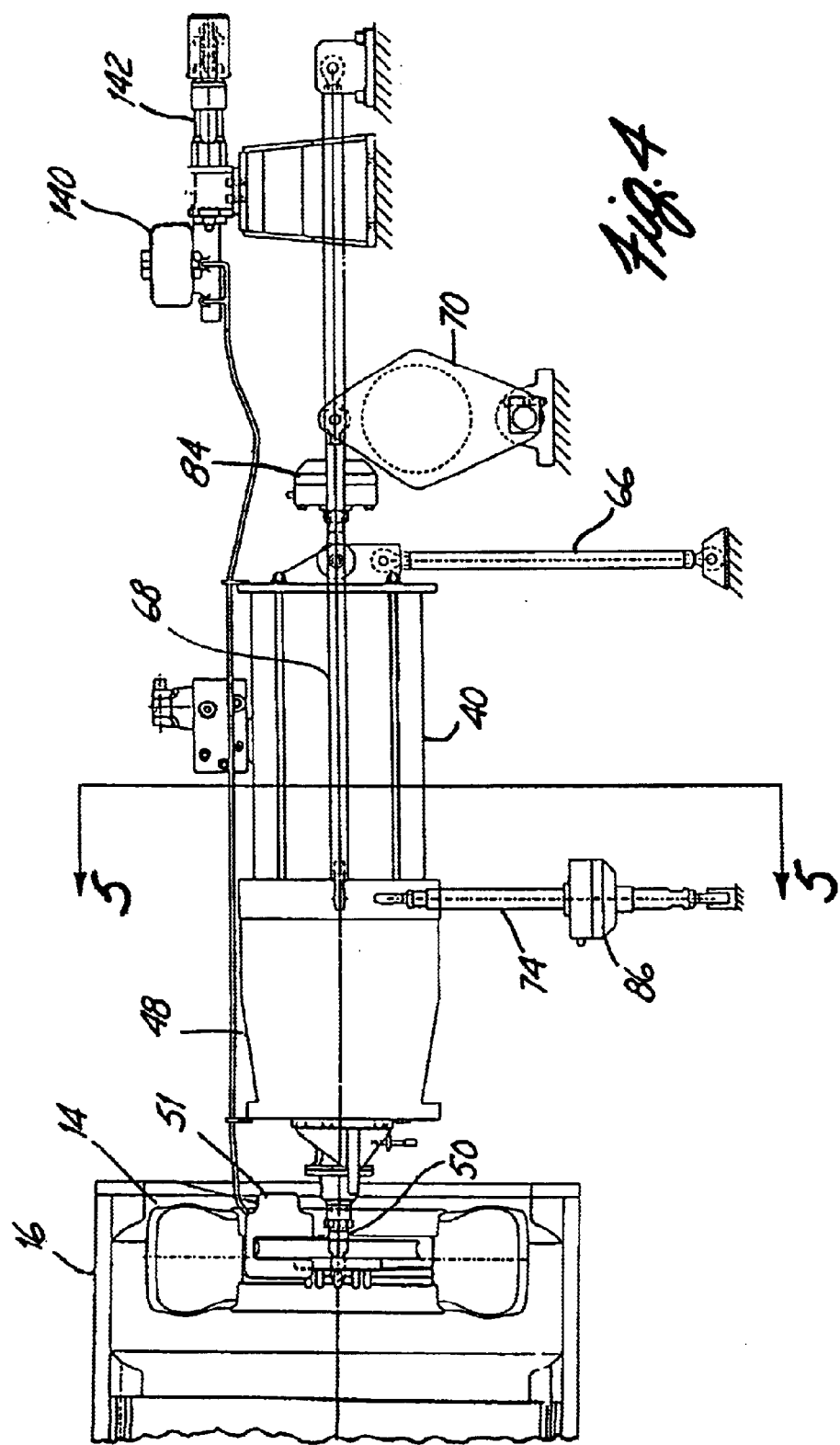
FIG. 4 is an elevational view of the testing apparatus with portions removed.
Figure 6:
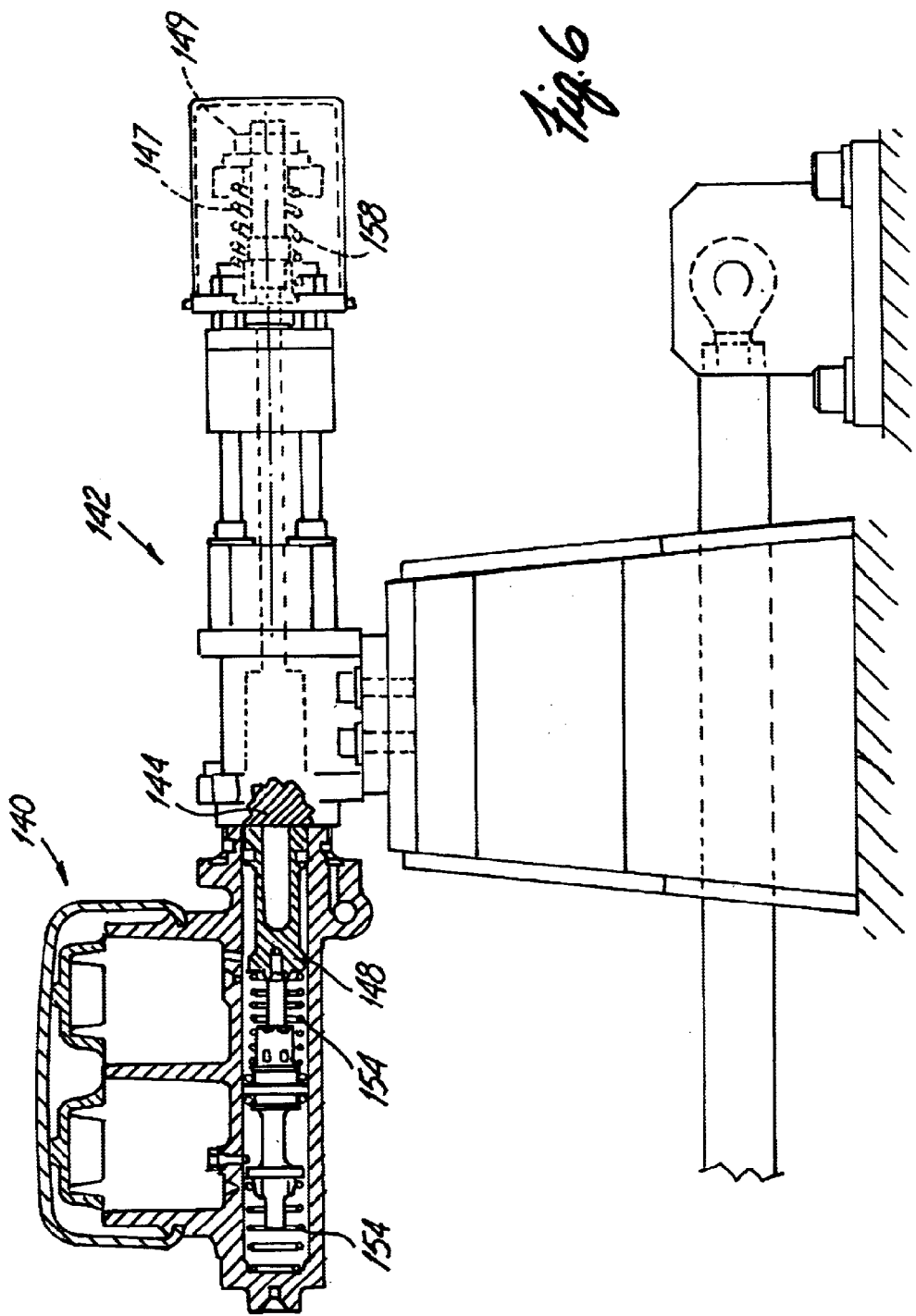
FIG. 6 is an elevational view of a master cylinder and actuator with portions removed.

A master cylinder assembly 140 suitable for application in a motor vehicle can be used in the testing apparatus 10 as illustrated in FIGS. 4 and 6. In a further embodiment, the master cylinder assembly 140 is suitable for a production motor vehicle. Use of the master cylinder assembly 140 that is actually used in a motor vehicle enables accurate testing of the braking system and, more importantly, actual operation of the braking system. In particular, an actuator 142 is provided to operate the master cylinder assembly 140 and initiate operation of the brake 51 at the spindle 48. Referring to FIG. 6, the actuator 142 includes a control mechanism, such as a servo valve, which initiates displacement of a piston 144 into abutting contact with a piston 148 of the master cylinder assembly 140 in one direction. In other words, the actuator 142 is controlled by the controller 80 to only displace the piston 148 of the master cylinder assembly 140 so as to initiate braking. As is well known, retraction of the piston 148 of the master cylinder assembly 140 is initiated by a spring or springs 154 present in the master cylinder assembly 140. However, the springs 154 are also further used to retract the piston 144 of the actuator 142. This more accurately simulates actual operation of the braking system wherein a driver of the motor vehicle depresses the brake pedal to initiate braking, but does not lift the brake pedal when braking is complete. In the embodiment illustrated, the actuator 142 can include a spring 158 to help move the piston 144 of the actuator 142 when the brake is released, if necessary. An adjustable tensioning mechanism, for example, a threaded rod 147 and nut 149, adjusts the pulling force of spring 158 when it is extended. It is preferable to maintain abutting contact of the pistons 144 and 148 to accurately simulate operation of the brake pedal. If a gap is formed between pistons 144 and 148 during retraction, subsequent operation of the actuator 142 can cause undesirable hammering of the piston 148. The springs 154 and spring 158, if necessary, maintain abutting contact between pistons 144 and 148. The actuator 142 can comprise a hydraulic, pneumatic or electromagnetic actuator.

Figure 7:
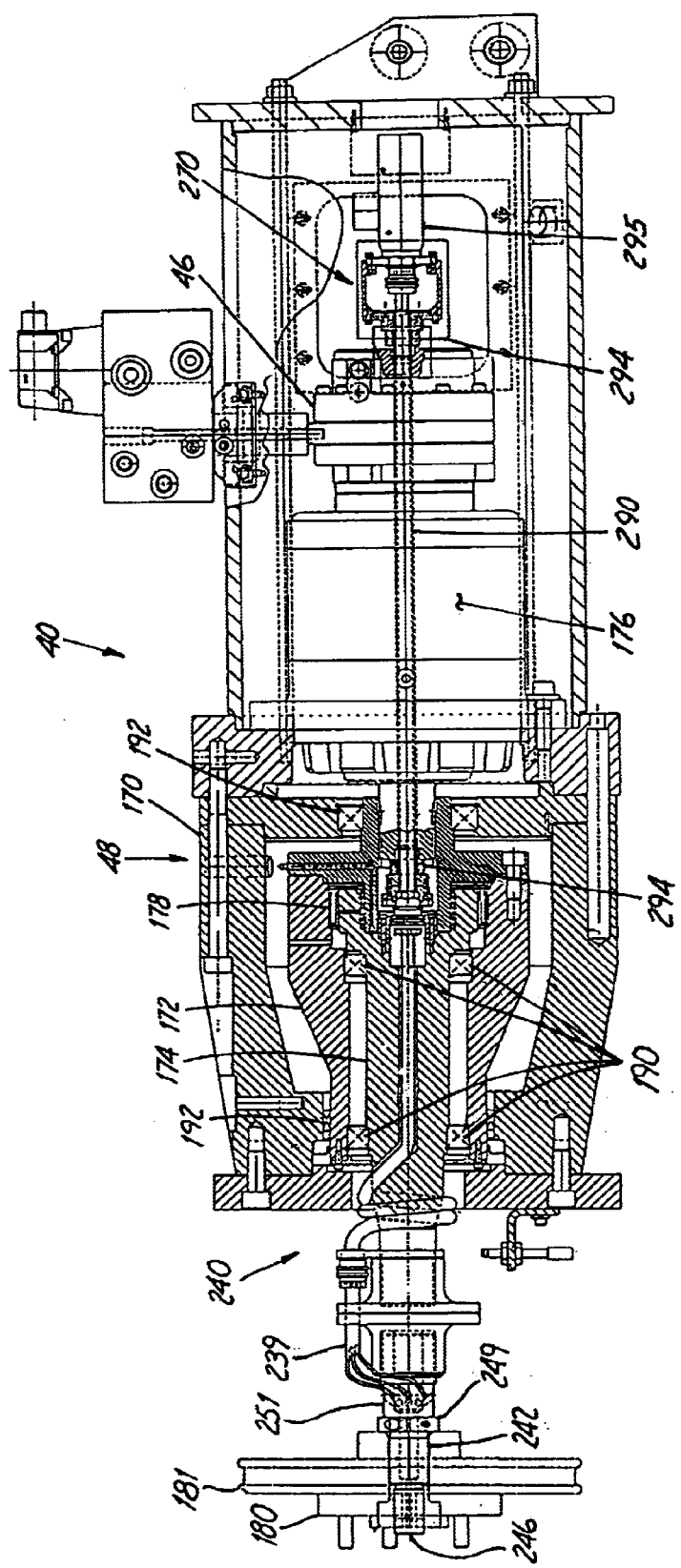
FIG. 7 is a sectional view of a drive motor torque/spindle assembly.

A sectional view of the drive motor assembly 40 is illustrated in FIG. 7. In a first mode of operation, generally at slow speeds, the drive motor assembly 40 is used to rotate the tire and wheel assembly 14 and apply a desired amount of drive torque for a selected number of revolutions. In another mode of operation generally at higher speeds, the rotating drum 16 (FIG. 1) is driven by the motor 24 in order to rotate the tire and wheel assembly 14. In the latter mode of operation, the motor 46 is not operated yet the spindle 48 must allow the tire and wheel assembly 14 to rotate. In the embodiment illustrated, the spindle 48 includes an outer stationary housing 170, an outer rotatable spindle member 172 and an inner rotatable spindle member 174. In the embodiment illustrated, the outer spindle member 172 is operably coupled to the motor 46 through a 68:1 gear reducer 176. A clutch 178 selectively locks the inner spindle member 174 to the outer spindle member 172 when the motor 46 is operated so as to rotate a spindle hub 180 that is used for mounting the tire and wheel assembly 14. In the embodiment illustrated, the clutch 178 is a mechanical clutch, and in particular, a "sprague" clutch available from Borg-Warner Automotive Automatic Transmission Systems Corporation of Bellwood, Ill., (Part No. 544962-01). However, when the drum 16 is used to rotate the tire and wheel assembly 14, the clutch 178 disengages the inner spindle member 174 from the outer spindle 172 allowing the inner spindle member 174 to freely rotate at a speed faster than the outer spindle member 172. Bearings 190 are provided between the inner spindle member 174 and the outer spindle member 172 to allow relative rotation of the inner spindle member 174 with respect to the outer spindle.member 172. Likewise, bearings 192 are provided between the outer spindle member 172 and the stationary housing 170 to allow the outer spindle member 172 to rotate relative to the housing 170.

Figure 8:
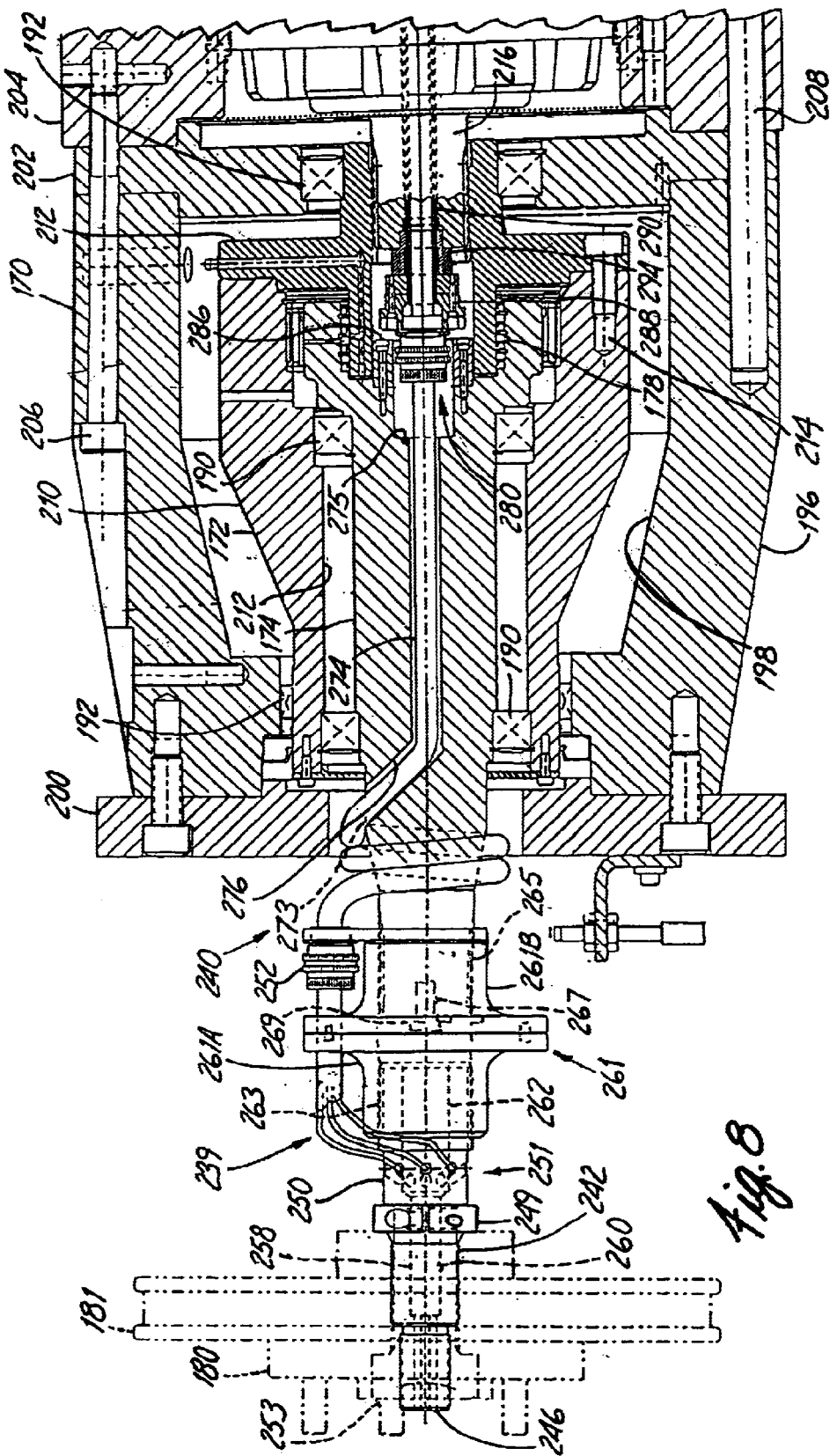
FIG. 8 is a sectional view of a spindle.
Figure 10:
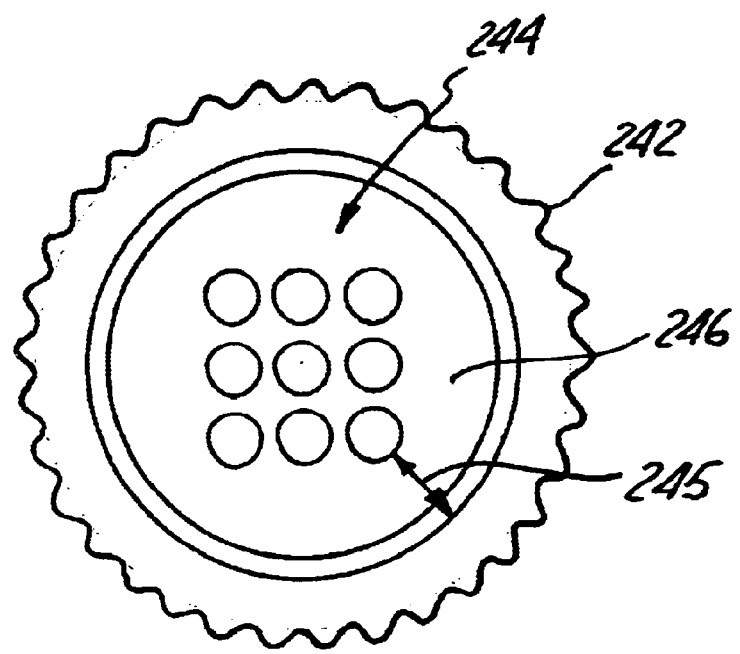
FIG. 10 is a plan view of a front end portion of a spindle shaft end.
Figure 11:
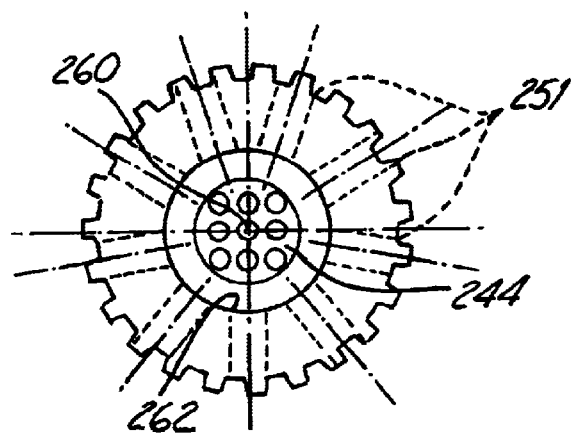
FIG. 11 is a plan view of a rear end of the spindle shaft end.

Referring to FIG. 8, the outer housing 170 includes a cylindrical member 196 having an inner cavity 198 for the spindle members 172 and 174. End plates 200 and 202 are joined to the cylindrical member 196 at opposite ends. The spindle 48 is secured to a support ring 204 of the driving motor torque assembly 40 with fasteners 206 and aligned thereon with pins 208.

The outer spindle member 172 includes a cylindrical member 210 forming a cavity 212 wherein the inner spindle member 174 is located. A hub 212 is joined to the cylindrical member 210, for example, by using fasteners 214. The hub 212 is joined to an output shaft 216 of the drive motor assembly 40 to rotate therewith.

Generally, the wheel of the tire and wheel assembly 14 includes measurement sensors such as strain gauges and/or other measurement sensors to measure various parameters of the tire and wheel loading assembly 14 during testing. It should be noted that specific application of the sensors to the tire and wheel assembly 14 does not constitute part of the invention. However, it is necessary that the measurement signals obtained from the tire and wheel assembly 14 be provided to the controller 80. A system 240 allows signal measurements to be obtained from the rotating tire and wheel assembly 14 while it rotates.

Referring to FIG. 8, the spindle 48, and in particular, the inner spindle member 174 is adapted to carry a plurality of signal wires 239 used to transmit the signal measurements. Referring also to FIGS. 9–12, a spindle shaft end 242 includes a plurality of spaced-apart bores 244 that open to an end surface 246 of the shaft end 242. Each of the bores 244 extend substantially parallel to an axis of rotation of the spindle 48. In contrast to a single bore through the shaft end 242 to carry the signal wires, the use of spaced-apart bores 244 retains the necessary strength on the shaft end 242 needed to react the axial loading applied to the spindle hub 180 and brake rotor 181. In other words, if a single bore was used of size necessary to accommodate all of the sensor wires, the shaft end 242 would not transmit the desired loading. In a preferred embodiment, the spaced-apart bores 244 are arranged in the rectangular or grid orientation illustrated in FIG. 10 wherein a center bore is substantially disposed on the axis of rotation of the spindle 48. As appreciated by those skilled in the art, other patterns can be used. In general, the spaced-apart bores 244 are clustered about the rotational axis in a manner so as to maximize the radial distance from the outermost edge of the bore furthest from the rotational axis, as illustrated by double arrow 245. The spaced-apart bores 244 provide guide passageways for the signal wire or wires provided therein so that the signal wire can be directed to and through the corresponding aperture 251. By using spaced-apart bores, the shaft end 242 can accept spindle hubs 180 suitable for application in a motor vehicle, and in particular, hubs 180 suitable for application in a production motor vehicle, such as a small car. As appreciated by those skilled in the art, the shaft end 242, having the spaced-apart bores 244, can be adapted for use with other rolling wheel testing apparatuses besides the exemplary embodiment shown herein. In other words, the driving torque motor assembly 240 need not be present.

The bores 244 eventually open to spaced-apart apertures 251 provided on a circumferential surface 250 of the shaft end 242. In this manner, the signal wires can extend out of the shaft end 242 and to a connector 252 that is positioned proximate separable portions of the spindle shaft of the spindle 48. Although separate bores can be used, in the embodiment illustrated, the bores 244 open to an inner common bore 258. The bore 258 can comprise a first portion 260 having a first diameter and a second portion 262 having a second diameter. The diameters of the first portion 260 and the second portion 262 are chosen so as to retain sufficient strength on the shaft end 242 to withstand applied loading and allow convenient wiring. A single diameter bore 258 can also be used. The wires 239 can be Teflon™ coated to minimize abrasion and resist heat from dynamic braking.

Inclined apertures or bores 251 extend from the circumferential surface 250 to the bore 258. In the embodiment illustrated, apertures 251 are spaced-apart at equal angular intervals about the rotational axis and the inclination of the bores 251 relative to the rotational axis of the spindle 48 forms an acute angle 247 approximately equal to 55°.

Figure 13:
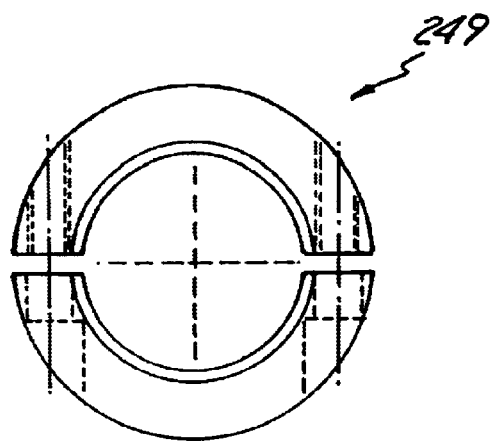
FIG. 13 is a side elevational view of a support member attachable to the spindle shaft end.
Figure 14:
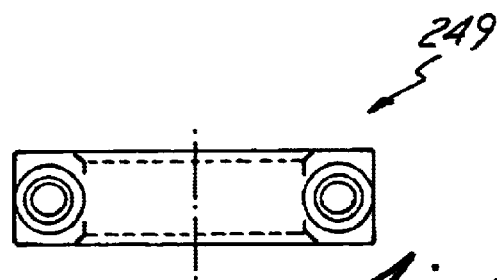
FIG. 14 is a top plan view of the support member.

A support member 249 illustrated in FIGS. 13 and 14 is securable to the spindle shaft end 242 as illustrated in FIG. 8. The support member 249 forms a support flange that contacts the back of spindle hub 180 when a spindle nut 253 is secured to the spindle shaft end 242. The support member 249 is preferably formed from a plurality of portions securable together. Use of a support member 249 that can be attached in position to the spindle shaft 242 allows a spline portion 255 (FIG. 9) to be properly cut therein.

In a preferred embodiment, the output shaft of the spindle 48 is separable herein where the shaft end 242 comprises a first separable portion and the inner spindle member 174 comprises a second separable portion. The connector 252 is positioned proximate the fastening position of the separable portions. In this manner, the shaft end 242, which may vary from vehicle to vehicle, can be easily interchanged without complete removal of the spindle 48.

In the embodiment illustrated, a spline coupler 261 receives a spline 263 of the shaft end 242 and a spline end 265 of the inner spindle member 174. The spline coupler 261 can be considered part of the shaft end 242 or the inner spindle member 174 for purposes of allowing the shaft end 242 to separate from the inner spindle member 174. The spline coupler 261 comprises two portions 261A and 261B that are keyed together to form a mechanical fuse in the event excessive torque is present on the output spindle shaft. The portions 261A and 261B separate to prevent damage to the spindle 48. Portion 261B is held on the inner spindle member 174 with a fastener 267 and a plate 269 that is locatable in an inner groove of the portion 261B.

In order to transmit signal measurements to a remote end 270 (FIG. 7) of the driving motor torque assembly 40, the plurality of signal wires 239 extend along the axis of rotation of the spindle 48 and the driving motor torque assembly 40. From the connector 252, the signal wires extend into a bore 274 that is formed on the axis of rotation of the spindle 48. The bore 274 includes an inclined portion 276 that opens to a circumferential surface 273 of the inner spindle member 174 at a first end. The bore 274 opens to an end surface of the inner spindle member 174 at a second end 275.

A connector 280 is provided at the second end 275 of the inner spindle member 174. The connector 280 includes a first portion 286 that is secured to the inner spindle member 174 to rotate therewith. A second portion 288 of the connector 280 is secured to a tubular member 290 that extends through the gear reducer 176 and the motor 46. A slip ring assembly 295 is joined to the tubular member 290 on an end opposite the spindle 48. The tubular member 290 is supported by bearings 294 located at each end, which allow the tubular member 290 to rotate freely within the shafts of the gear reducer 176 and the motor 46. The signal wires 239 extend through the tubular member 290 and are conventionally connected to the slip ring assembly 295, as illustrated in FIG. 7. The slip ring assembly 295 provides the measurement signals to the controller 80.

In summary, the shaft end 242 having the plurality of spaced-apart bores 244 allows a spindle hub 180 used in a motor vehicle to be used in the testing apparatus 10. In a further embodiment, the signal wires 239 extend through the inner spindle member 174 and through the tubular member 290 to the slip ring assembly 295 along the axis of rotation of the spindle 48 and drive motor assembly 40. The tubular member 290 rotates the signal wires 239 with the inner spindle member 174 when the inner spindle member 174 rotates at a speed faster than rotation of the outer spindle member 172, gear reducer 176 and motor 46.

Figure 15:
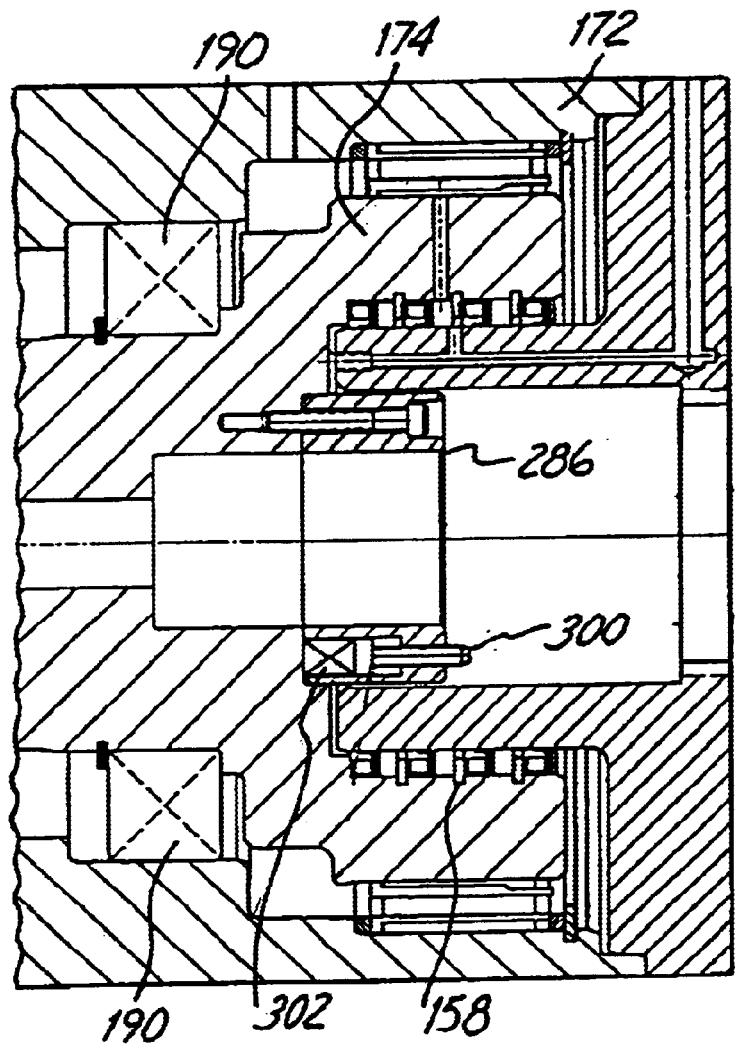
FIG. 15 is a sectional view of a portion of the spindle.

Referring to FIG. 15, a drive pin 300 is preferably provided between the connector portions 286 and 288. In this manner, the connector pins of the connector 280 are not used to drive the tubular member 290. In the embodiment illustrated, the guide pin 300 is biased by a spring 302 in order to ensure positive engagement.

Although the present invention has been described with reference to preferred embodiments, workers skilled in the art will recognize that changes may be made in form and detail without departing from the spirit and scope of the invention.

What is claimed is:

1. A rolling wheel testing apparatus comprising:
   a rotatable drum;
   a brake coupled to the drum to selectively inhibit rotation;
   a driving motor torque assembly having a hub to support a tire and wheel assembly and a motor directly coupled to the hub to rotate the hub, wherein the hub is spaced apart from a surface of a drum so that the tire is in rolling contact with the drum and wherein the drum is rotated by driving the hub;
   a torque sensor providing a signal indicative of a torque sensed about an axis of rotation of the tire and wheel assembly; and
   a controller operably coupled to the torque sensor, the motor, and the brake, the controller receiving the signal indicative of the torque sensed about the axis of rotation of the tire and wheel assembly and adapted to operate the brake to inhibit rotation of the drum to develop a selected amount of torque about the axis of rotation of the tire and wheel assembly as the tire and wheel assembly is being rotated.

2. The rolling wheel testing apparatus of claim 1 wherein the brake comprises:
   a disc joined to the drum to rotate therewith; and
   a caliper coupled to the disc to selectively inhibit rotation of the disc.

3. The rolling wheel testing apparatus of claim 2 and further comprising:
   a base; and
   a pair of support struts pivotally joined to the base and coupled to the driving motor torque assembly, wherein the support struts are disposed opposite each other with an axis of rotation of the driving motor torque assembly located therebetween.

4. The rolling wheel testing apparatus of claim 3 wherein the torque sensor comprises a pair of load cells, wherein each load cell is joined to one of the support struts and the driving motor torque assembly.

5. The rolling wheel testing apparatus of claim 4 and further comprising an actuator coupled to the driving motor torque assembly to apply a load substantially perpendicular to the axis of rotation.

6. The rolling wheel testing apparatus of claim 5 and further comprising a motor operably coupled to the drum to rotate the drum.

7. The rolling wheel testing apparatus of claim 1 further comprising:
   a speed sensor providing a signal indicative of an angular speed of the tire and wheel assembly about the axis the rotation, wherein the controller is operably coupled to the speed sensor, the controller receiving the signal indicative of the angular speed and operating the motor so that the tire and wheel assembly rotates at a selected angular speed.

8. A method of operating, a rolling wheel testing apparatus comprising the steps of:
   applying a drive torque to a tire and wheel assembly about an axis of rotation to drive the tire and wheel assembly and a rotatable drum with the tire in rolling contact with the rotatable drum;

sensing a torque about the axis of rotation;

applying a brake torque to inhibit rotation of the drum so as to develop a selected amount of torque about the axis of rotation while the tire and wheel assembly is being rotated.

9. The method of claim 8 wherein a brake assembly is operably coupled to the drum and wherein applying a brake torque to inhibit rotation of the drum comprises operating the brake assembly.

10. The method of claim 8 further comprising sensing an angular speed of the tire and wheel assembly about the axis of rotation.

11. The method of claim 10 wherein applying the drive torque includes applying the drive torque so as to develop a selected angular speed in response to the angular speed sensed about the axis of rotation.

* * * * *